United States Patent

[11] 3,608,846

[72] Inventor Hanswerner Pieplow
 Nuernberg, Germany
[21] Appl. No. 10,246
[22] Filed Feb. 10, 1970
[45] Patented Sept. 28, 1971
[73] Assignee Grundig E.M.V. Elektro-Mechanische
 Versuchsonstalt
 Fuerth am Bayern, Germany
[32] Priority Mar. 14, 1969
[33] Germany
[31] P 19 12 990.9

[54] TAPE RECORDER
 10 Claims, 1 Drawing Fig.
[52] U.S. Cl. ................................................. 242/201,
 33/127, 74/567, 116/135, 242/75, 274/4 C
[51] Int. Cl. ................................................. G11b 15/32,
 G03b 1/04
[50] Field of Search ......................................... 242/57,
 187, 193, 194, 197, 201, 202, 205, 206; 74/567,
 569; 33/127; 274/11 C, 11 D, 11 E, 4 C, 4 D;
 116/135

[56] References Cited
UNITED STATES PATENTS
2,767,474 10/1956 Schmitt, Jr. .................. 33/127
2,998,749 9/1961 Oji et al. ...................... 74/567 X
3,025,607 3/1962 Pattantyus .................... 33/127
3,046,019 7/1962 Holladay et al. .............. 274/11 X
3,441,283 4/1969 Jager ............................ 274/11
3,476,894 11/1969 Pless ............................ 242/201 X
FOREIGN PATENTS
712,756 7/1965 Canada ........................ 33/127
Primary Examiner—Stanley N. Gilreath
Assistant Examiner—Werner H. Schroeder
Attorney—Michael S. Striker ABSTRACT: The pointer which is movable along a scale on the deck of a tape recorder to indicate that length of tape which is available for recordal or reproduction of sound has a follower which tracks the thread of a spindle driven by the takeup reel at a speed which varies as a function of changes in diameter of tape which is convoluted on the core of the takeup reel. The graduations of the scale are equidistant from each other; therefore, the pitch of the thread on the spindle varies as a function of changes in rotational speed of the takeup reel when the tape is transported at a constant speed.

PATENTED SEP 28 1971
3,608,846
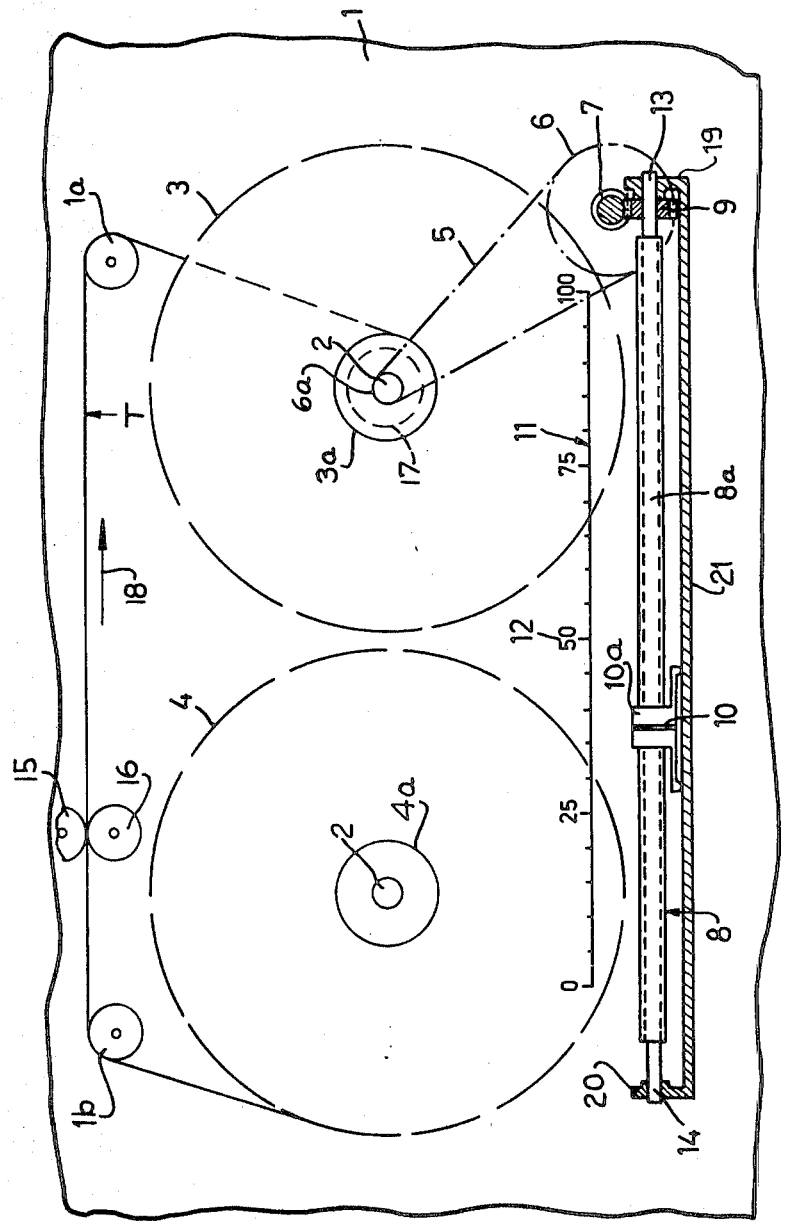
Inventor:
HANSWERNER PIEPLOW
By
[signature]
Attorney

TAPE RECORDER

BACKGROUND OF THE INVENTION

The present invention relates to sound recording and/or reproducing apparatus (hereinafter called tape recorders), and more particularly to improvements in a mechanism which moves the pointer along a scale serving to indicate the length of tape which is convoluted on the supply or takeup reel.

A tape recorder comprises a transporting mechanism which moves the tape lengthwise at a constant speed whereby the supply and takeup reels rotate at a speed which varies as a function of the diameter of tape which is convoluted on their cores. For example, if the tape is being withdrawn from the supply reel, the diameter of tape on the core of the supply reel decreases and the diameter of tape on the core of the takeup reel increases. Consequently, and assuming that the tape is transported at a constant speed, the takeup reel must be rotated at a decreasing speed and the speed of the supply reel increases proportionally with the increase in diameter of convoluted tape on the core of the takeup reel.

Many tape recorders are further provided with indicating means to facilitate continuous determination of that length of tape which is already convoluted on the core of the takeup reel (or which is still stored on the core of the supply reel). As a rule, such indicating means comprises an elongated scale whose graduations indicate different lengths of tape or different units of time, a pointer which is movable along the scale, and a spindle which is driven by one of the reels and whose thread is tracked by a follower on the pointer so that the pointer moves along the scale in response to rotation of the spindle. The pitch of the thread on the spindle (namely, the distance, measured parallel to the spindle axis, between corresponding points on adjacent threads in the same axial plane) is constant; therefore, the distance between successive graduations must vary as a function of changes in rotational speed of the reel which drives the spindle. If the spindle is driven by the takeup reel, the distance between successive graduations of the scale increases in the direction in which the pointer travels when the takeup reel is rotated to collect the tape. Thus, and assuming that the graduations of the scale represent units of time, the distance between successive graduations at one end of the scale is but a small fraction of the distance between graduations at the other end of the scale. The same applies if the graduations indicate unit lengths of tape. Such nonuniform distribution of graduations is a source of constant irritation to the user of the tape recorder. The problems are similar if the takeup reel drives a digital counter because the wheels of the counter rotate much faster when the takeup reel begins to collect the tape and very slowly when the trailing portion of the tape is about to be collected by the core of the takeup reel.

SUMMARY OF THE INVENTION

An object of the invention is to provide a tape recorder with novel and improved indicating means wherein the pointer covers identical distances per unit of time despite the fact that the drive for the pointer receives motion from one of the reels, i.e., from a part whose speed changes continuously while the tape is caused to move at a constant speed.

Another object of the invention is to provide a novel and improved spindle for use in such indicating means.

A further object of the invention is to provide indicating means wherein the graduations of the scale are equidistant from each other despite the fact that the pointer is driven by means which receives motion from one of the reels.

The improved tape recorder comprises a support which may constitute a deck for two discrete reels or the housing of a cassette, a pair of reels rotatably mounted on the support, a length of magnetic tape having ends connected with the cores of the two reels, transporting means for advancing the tape lengthwise at a predetermined speed and for rotating one of the reels so that the respective core collects the tape thereon and the speed of the reels varies as a function of changes in diameter of convoluted tape on the cores of the reels, a scale provided on or in the support and having a of equidistant graduations, a pointer which is movable along the scale, and novel drive means for moving the pointer along the scale. The drive means comprises an externally threaded spindle which is rotatable with reference to the support and extends in parallelism with the scale, follower means provided on the pointer and tracking the thread of the spindle so that the pointer moves in response to rotation of the spindle, and means (preferably including a belt drive and a worm drive) for rotating the spindle in response to and in synchronism with rotation of one of the cores. In accordance with a feature of the invention, the pitch of the thread on the spindle varies from one end toward the other end of the spindle in such a way that the pointer is moved through identical distances per each unit of time in response to rotation of the one core while the tape is advanced at the predetermined speed. Thus, by utilizing a spindle whereon the pitch of the thread varies as a function of changes in rotational speed of the reels, the pointer can cover identical distances during successive unit lengths of time so that the reading of the scale is more convenient because all of the graduations on the scale can be placed at the same distance from each other regardless of whether such graduations indicate units of time or unit lengths of tape.

The novel features which are considered as characteristic of the invention are set forth in particular in the appended claims. The improved tape recorder itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary schematic plan view of a tape recorder which embodies the invention, certain parts of the tape recorder being shown in section.

DESCRIPTION OF THE PREFERRED EMBODIMENTS

The drawing illustrates a portion of a tape recorder including a deck 1 which constitutes a support for a takeup reel 3 having a core 3a and a supply reel 4 whose core is shown at 4a. The trailing and leading ends of the magnetic tape T are respectively connected with the cores 4a, 3a and the tape is trained over guide rolls 1a, 1b. The recording, erasing and reproducing heads are not shown. The transporting mechanism for moving the tape T lengthwise at a constant speed comprises a driven wheel 15 which is movable toward and away from an idler wheel 16 to move the tape lengthwise when it assumes the illustrated position. The transporting mechanism further includes a clutch element 17 which drives the core 3a of the takeup reel 3 when the tape is transported in the direction indicated by arrow 18. During such lengthwise movement of the tape T at a constant speed, the rotational speed of the reel 3 and core 3a decreases proportionally with an increase in diameter of tape which is convoluted on the core 3a. The rotational speed of the reel 4 (which then rotates in response to pull exerted by the tape T) increases at the same rate at which the r.p.m. of the core 3a decreases. The numerals 2, 2a respectively denote the shafts for the cores 3a, 4a. Each of the reels can be slipped onto and removed from the respective shaft.

The indicating means which enables the user to determine the length of tape on the core 3a and/or 4a includes an elongated scale 11 having equidistant graduations 12 which indicate units of time (for example, in minutes) or unit lengths of tape (for example, in meters or feet).

A pointer or index 10 is mounted for travel along the scale 11 and the drive means for moving the pointer includes an elongated spindle 8 whose end portions 13, 14 are journaled in bearings 19, 20 provided on the deck 1. The spindle 8 is parallel with the scale 11 and its external thread 8a is tracked by a follower 10a of the pointer 10. The latter is held against rotation about the spindle 8 by an elongated guide 21. The mechanism which drives the spindle 8 comprises a first pulley 6a on the shaft 2 or core 3a, a second pulley 6 which is mounted on a worm shaft 7, an endless belt or rope 5 which is trained over the pulleys 6, 6a and drives the pulley 6 at a speed which is less than but proportional to the speed of pulley 6a and core 3a, and a worm wheel 9 which is rigid with the spindle 8 and meshes with the worm on the shaft 7. Thus, the speed of the spindle 8 varies with the speed of the core 3a.

In accordance with a feature of the invention, the pitch of the thread 8a on the spindle 8 varies from the end portion 13 toward the end portion 14 in such a way that, when the tape T is advanced at a constant speed and the reel 3 is rotated at a decreasing speed, the pointer 10 advances through identical distances per successive units of time. Thus, the pitch of the thread 8a increases from the end portion 13 toward the end portion 14 at the same rate at which the r.p.m. of the core 3a decreases when the reel 3 rotates in response to transport of tape T at a constant speed (arrow 18).

The spindle 8 is preferably made by injection molding from suitable synthetic plastic material. The variations in the pitch of the thread 8a can be determined by resorting to the equation $$s = so \sqrt{1 + \frac{v \cdot t \cdot d}{\pi \cdot r^2}}$$

wherein $s$ is the variation in pitch, $s^o$ is the initial value of the pitch at the end portion 13, $v$ is the speed of tape T, $t$ is the interval of time during which the tape is transported, $d$ is the thickness of tape, and $r$ is the radius of the core 3a. It will be seen that the rate at which the pitch $s$ varies is reciprocal to the rate at which the r.p.m. of the core 3a changes while the tape T advances at a constant speed.

When the pointer 10 is located, for example, halfway between the ends of the thread 8a, the user of the tape recorder knows that one-half of the tape T is still available for recordal or reproduction of sound.

It is clear that the support 1 can constitute the housing of a cassette for magnetic tape and that the parts 8, 10, 11 are then mounted in or on the housing of the cassette.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is:

1. In a tape recorder, a combination comprising a support; a pair of reels rotatably mounted on said support and each having a core; a length of magnetic tape having end portions connected with said cores; transporting means for advancing the tape at a predetermined speed and for rotating one of said reels so that the respective core collects the tape thereon and the speed of said reels varies as a function of changes in diameter of convoluted tape on said cores; a fixed scale having a row of equidistant graduations; a pointer movable along said scale and including follower means; and drive means for moving said pointer along said scale, including a spindle rotatably mounted on said support and extending in parallelism with said scale, said spindle having an external thread tracked by said follower means so that the latter moves the pointer in response to rotation of said spindle, and means for rotating said spindle in response to and in synchronism with rotation of one of said cores, the pitch of said thread varying from one end toward the other end of said spindle so that said pointer is moved through identical distances per each unit of time in response to rotation of said one core while the tape is advanced at said predetermined speed.

2. A combination as defined in claim 1, wherein said support is the deck of the tape recorder.

3. A combination as defined in claim 1, wherein the rate at which the pitch of said thread varies is the reciprocal of the rate at which the speed of said one core varies while the tape is transported at said predetermined speed.

4. A combination as defined in claim 1, wherein the pitch $s$ of said thread varies in accordance with the equation $$s = so \sqrt{1 + \frac{v \cdot t \cdot d}{\pi \cdot r^2}}$$

wherein $so$ is the pitch at said one end of the spindle, $v$ is the speed of the tape, $t$ is the length of the interval during which the tape is transported, $d$ is the thickness of tape, and $r$ is the radius of said one core.

5. A combination as defined in claim 1, wherein said spindle consists of synthetic plastic material.

6. A combination as defined in claim 1, wherein said means for rotating said spindle comprises a worm drive.

7. A combination as defined in claim 1, wherein said means for rotating said spindle comprises a belt drive.

8. A combination as defined in claim 1, wherein said graduations indicate various lengths of the tape.

9. A combination as defined in claim 1, wherein said graduations indicate units of time.

10. A combination as defined in claim 1, wherein said reels include a supply reel and a takeup reel and said one core is the core of said takeup reel.